Oct. 29, 1968   H. I. BECKER, JR   3,408,486
PROCESS FRACTION DEFECTIVE MONITOR
Filed May 7, 1965

INVENTOR.
HOWARD I. BECKER Jr.
BY W. J. Shanley, Jr.
HIS ATTORNEY

United States Patent Office 3,408,486
Patented Oct. 29, 1968

3,408,486
PROCESS FRACTION DEFECTIVE MONITOR
Howard I. Becker, Jr., Louisville, Ky., assignor to General Electric Company, a corporation of New York
Filed May 7, 1965, Ser. No. 454,096
5 Claims. (Cl. 235—92)

ABSTRACT OF THE DISCLOSURE

A reversible counter indicates the fraction of defective products on a production line. The counter counts up for each N product monitored and counts down for each rejected product. The counter is inhibited from counting up or down beyond preset limits such that a fading with time memory is realized. When the count is above a preset limit, one indication is provided. When the count is below a preset limit, another indication is provided.

Background of the invention

The invention relates to quality control indicating systems, and more particularly to an "on line" quality control indicator of the type which continually senses the fraction of a product that is defective.

One of the pressing manufacturing problems in this era of high-speed production relates to the necessity of being able to rapidly measure and control the quality of products as they are being produced. Many improvements have been made in statistical sampling techniques thus permitting accurate control when up-to-date information is available. However, delays are commonly encountered before management is aware of a high reject situation because of the lack of such information. This results in tardy correction of the problem.

It is, therefore, and object of this invention to provide a new and improved quality control monitoring system which continually monitors the process fraction defective and indicates significant changes therein.

Summary of the invention

In accordance with my invention, the fraction of a product produced that is defective is measured by measuring rejects as a function of production. In doing so, "reject credits" are accumulated and held in reserve to be later dispensed when rejects are encountered. The accumulation and dispensing functions may be conveniently provided by a reversible counter which is caused to count upward one count for each N unit of production being presented while it counts down one count for each reject discovered. Indicating means is provided for the counter for showing when the counter has sensed a fraction defective larger than that desired. In this case, the indicator will be in its red range to indicate this condition. If, however, the fraction detected is less than the desired quantity, the counter indicator will be in its green range. In accordance with my invention, the counter is saturable when counting in both directions. In this way, there will be a maximum number of reject credits which may be stored and, also, there will be a maximum number of rejects which can be stored. This saturable characteristic of the reversible counter which is established as a function of the average production rate provides a "fading with time" characteristic which has been found to be so highly desirable in practice so as to prevent the mointoring system from saturating. This fading with time characteristic is necessary in order to prevent a good portion of a production run, e.g., a period of six hours, from registering enough reject credits to overshadow completely a very poor portion at a later time. Thus, by setting the point at which the counter will saturate when counting upwardly, at a point which is related to the rate at which production is taking place, the counter may be made to saturate at some level, e.g., an hour's worth of reject credits, which will permit a later degeneration of the process to evidence itself by allowing the counter to rapidly count down to a point which will indicate to management this deterioration.

In like manner, the lower limit of the counter when counting downwardly into the reject range will also be limited so that the indicator need not run in the reject range for a long time before a good production run will be able to bring the indicator out of this range.

It is another feature of this invention that at the beginning of each production run the counter is reset to a count falling in the green range so as to effect the depositing of "initial reject credits," the need for which arises from statistical theory associated with small lots. In this way, the indicator will tolerate the occurrence of more than the desired process fraction defective during the testing of a small lot sample.

Brief description of the drawings

These and other objects and advantages of the invention will become apparent as this description proceeds with reference to FIG. 1, which is a schematic representation of a monitoring system in accordance with the invention.

Description of the invention

Figure 1:
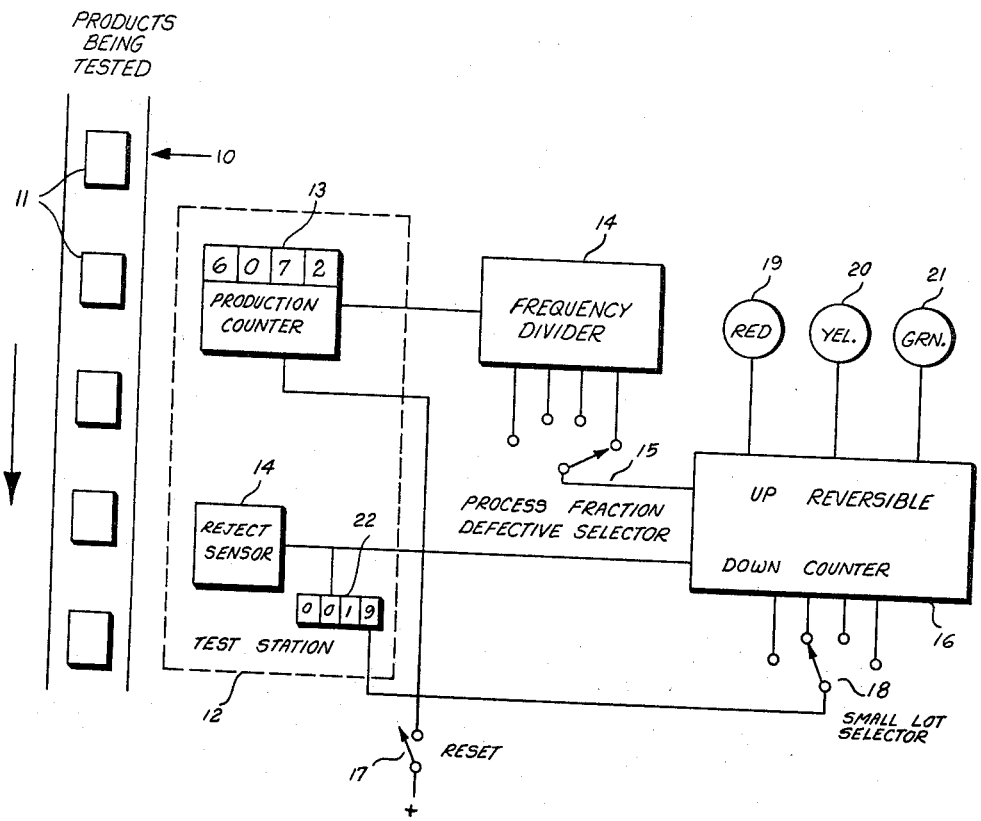

Referring now to FIG. 1, there is disclosed a conveying system 10 which sequentially presents the products 11 to be tested at test station 12. Test station 12 is illustrated as comprising a production counter 13 and a reject sensor 14 which respectively count the total production and sense the rejects passing on conveyor system 10.

Production counter 13 besides sensing the products arriving at test station 12 and visually indicating this count also performs a frequency division function to divide down the frequency of the signals applied to frequency divider 23 so as to permit it to obtain the range of control necessary to set up the desired process fraction defective by selector switch 15.

Means is provided for connecting the outputs of switch 15 and sensor 14 to the UP and DOWN inputs respectively of reversible counter 16 so as to count rejects as a function of total production. Register 22, which is also coupled to the output of sensor 14, may be conveniently provided to provide a visual indication of the number of rejects. This permits the operator at test station 12 to take appropriate action when a reject has been sensed by sensor 14.

Reset switch 17 and small lot selector switch 18 provide means for presetting reversible counter 16 to the desired count at the beginning of each production run so as to reduce the disturbing influence of encountering several rejects in a row at the beginning of the run. The particular count selected, of course, will be determined by the experience related to the particular products being tested and all the other conditions associated therewith.

Figure 2:
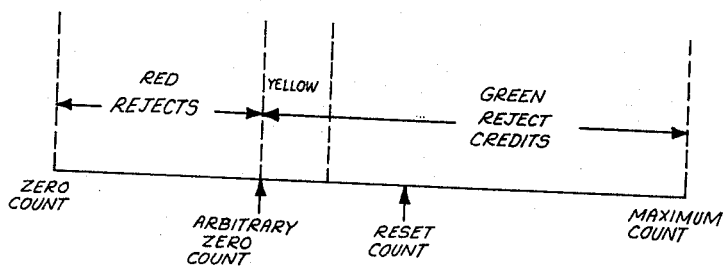
FIG. 2 is a diagram useful in explaining the relationship between the indicator lamps and the counts registered in the counter.

Referring now to FIG. 2, there is disclosed a plot of the counts of counter 16 from zero count to its maximium count. As was hereinbefore pointed out, counter 16 is either incapable of or may be inhibited from counting above the maximum count illustrated or below the count selected as the zero count. This provides the desired saturation characteristic necessary to provide the fading with time characteristic hereinbefore mentioned. It will be noted that the red indicator lamp 19 will be in its energized condition when counter 16 registers a count between the zero count and the arbitrary zero count illustrated in FIG. 2.

When the counter is in this range, it may be thought of as storing "rejects" while any count above this range will result in storing "reject credits."

Yellow indicator 20 may be conveniently provided to indicate a transition period between the green and the red conditions so as to operate as a warning to the person observing the monitor of a change in the process fraction defective being sensed at test station 12, while green indicator 21 provides means for indicating that the production line being sampled is providing products having a lesser number of rejects than that indicated by the setting of selector switch 15.

In operation, it may be seen that at the beginning of a production run production counter 13 and reject register 22 may be set to zero simultaneously with the resetting of reversible counter 16, by operating switch 17. This will place counter 16, assuming that switch 18 is in the correct position, at the appropriate reset count for the production run to be monitored. Switch 15 should also be set to the appropriate position to select the maximum acceptable fraction of the production which may be rejects. For example, if one reject for every 100 products is acceptable, switch 15 is set so that the total division provided by counter 13 and frequency divider 23 will be 100. Thus if at any time the process fraction rejected exceeds this rate of rejects, counter 16 will start counting downward towards the yellow count range. If this condition lasts long enough, green indicator 21 will be extinguished and yellow indicator 20 will come on to indicate a warning situation. Assuming that this condition continues and counter 16 then counts down below the arbitrary zero count, then indicator light 19 will come on indicating a condition which will call for appropriate corrective action.

Assuming now that this appropriate corrective action is taken and the rate of rejects falls below the acceptable rate called for by selector switch 15, the counter will immediately start counting upward towards the yellow and green zones. Hence in accordance with this invention, since the total count capacity between the zero count and arbitrary zero count is small counter 16 will be able to quickly go from its yellow to its green condition indicating the corrective action taken was effective.

While a particular embodiment of the subject invention has been shown and described herein, it is in the nature of description rather than limitation, and it will occur to those skilled in the art that various changes, modifications and combinations may be made within the province of the appended claims without departing either in spirit or scope from this invention in its broadest aspects.

What I claim as new and desire to secure by Letters Patent of the United States is:

1. A process fraction defective monitor for collecting and displaying quality control information pertaining to products being sequentially presented at a test station comprising: means for measuring a predetermined parameter of each product as it is presented at said test station and generating a reject signal whenever said parameter falls outside acceptable limits, means for generating a second signal for each N product presented at said test station, reversible counting means having add and subtract inputs, means for applying said reject signals to said subtract input and said second signals to said add input, means for resetting said counter to a predetermined reset count, first means coupled to said conuter for indicating when said counter is registering a count in a first predetermined range which includes said predetermined count, second means coupled to said counter for indicating when said counter is registering a count in a second predetermined range, said second range spanning counts lower than counts in said first range, said counter being inhibited from registering counts above said first range and below said second range.

2. The combination of claim 2 in which said second signal generating means comprises second counting means for counting each product presented at said test station.

3. The combination of claim 2 in which said second signal generating means further comprises frequency dividing means connected between the output of said second counting means and said add input, said frequency dividing means being adjustable to vary the value of N so as to provide means for setting the acceptable process fraction defective, N being an integer.

4. The combination of claim 3 further comprising third means coupled to said counter for indicating when said counter is registering a count below said first range and above said second range.

5. The combination of claim 4 in which said resetting means comprises switching means for selecting the desired reset count in accordance with the production process being monitored.

References Cited

UNITED STATES PATENTS

| | | | |
|---|---|---|---|
| 2,721,701 | 10/1955 | Hardesty | 235—92 |
| 2,767,914 | 10/1956 | Merrill | 235—92 |
| 2,768,784 | 10/1956 | Gordon | 235—92 |
| 2,893,635 | 7/1959 | Gitzendanner | 235—92 |
| 3,082,871 | 3/1963 | Duncan | 235—92 |
| 3,342,981 | 9/1967 | Laishley | 235—92 |

MAYNARD R. WILBUR, *Primary Examiner.*

G. J. MAIER, *Assistant Examiner.*